O. P. BARNES.
PERMUTATION MECHANISM.
APPLICATION FILED JUNE 13, 1918.
1,316,934.
Patented Sept. 23, 1919.
3 SHEETS—SHEET 1.
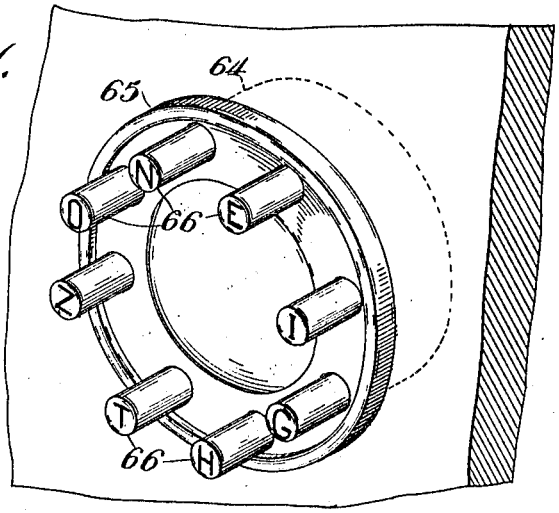
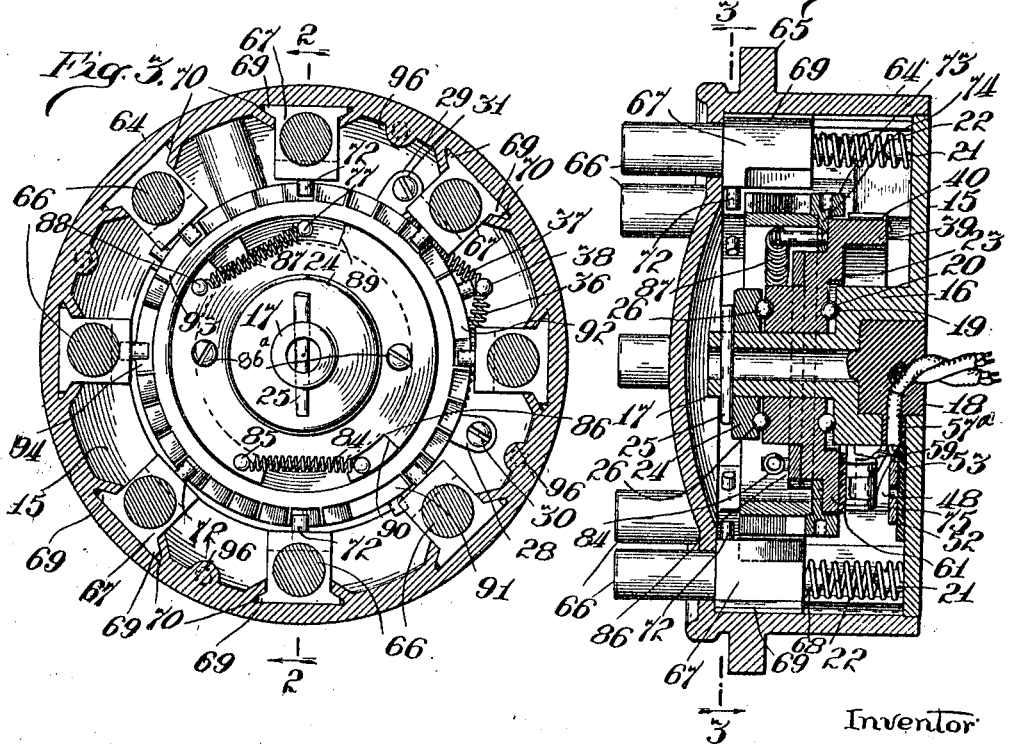

O. P. BARNES.
PERMUTATION MECHANISM.
APPLICATION FILED JUNE 13, 1918.
1,316,934.
Patented Sept. 23, 1919.
3 SHEETS—SHEET 2.
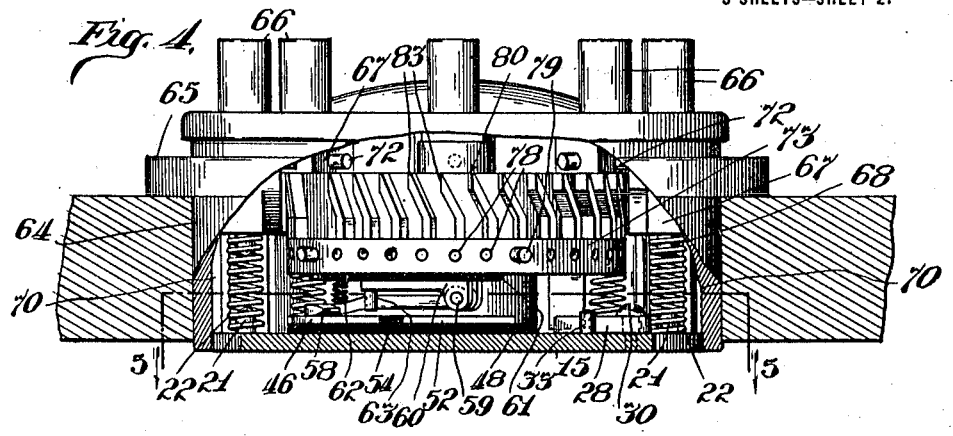
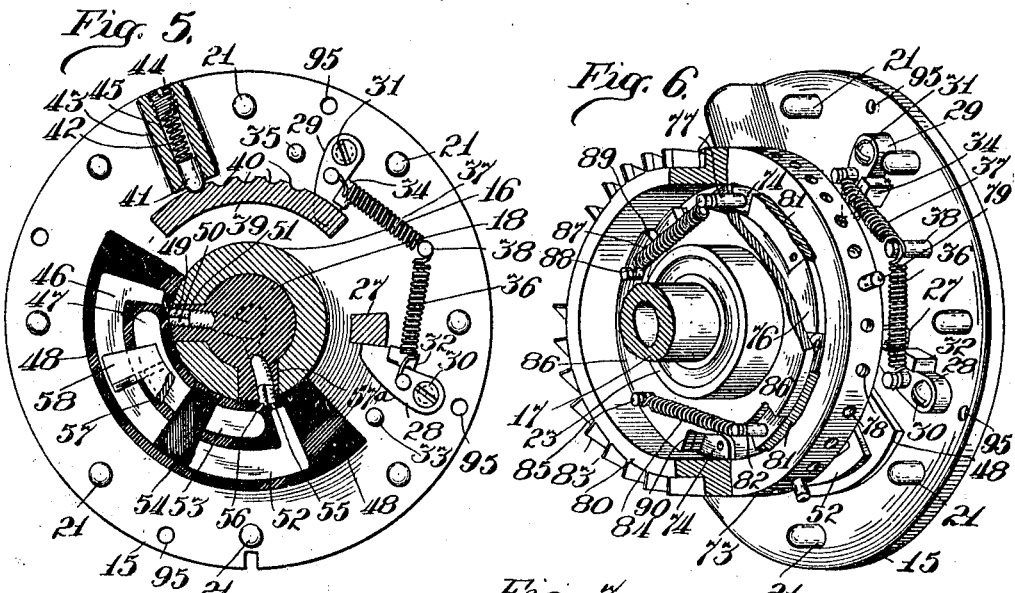
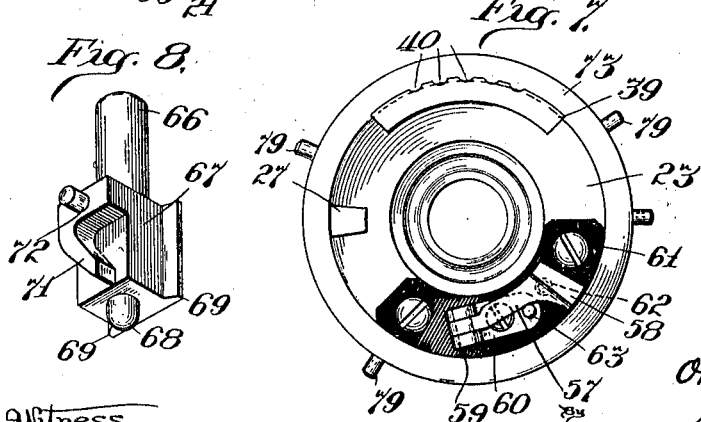

O. P. BARNES.
PERMUTATION MECHANISM.
APPLICATION FILED JUNE 13, 1918.
1,316,934.
Patented Sept. 23, 1919.
3 SHEETS—SHEET 3.
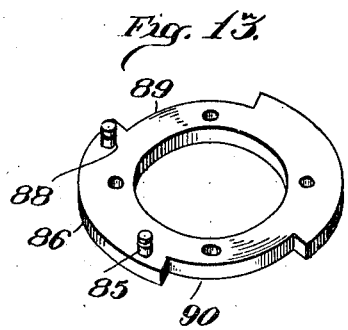
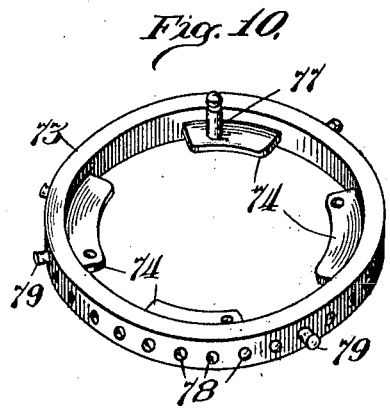
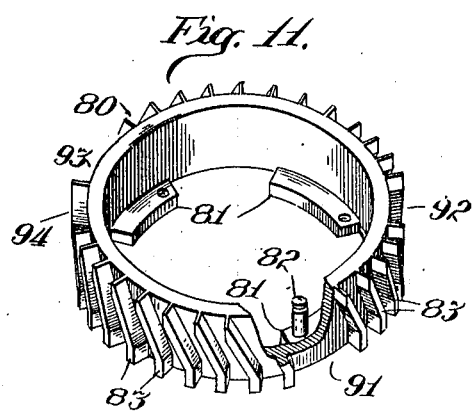
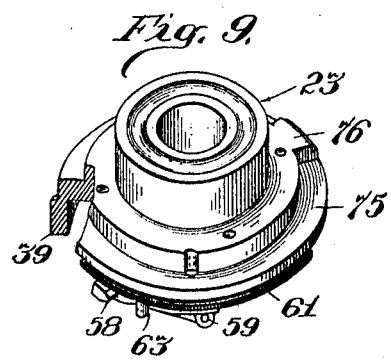
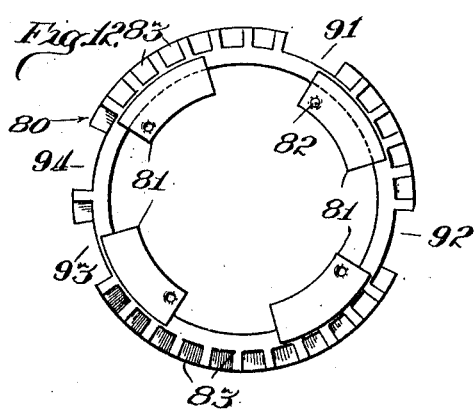
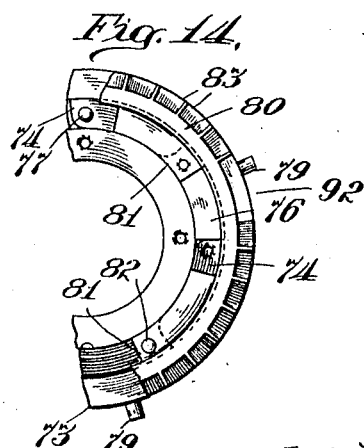
Inventor
Orange P. Barnes,
Attorneys

UNITED STATES PATENT OFFICE.

ORANGE P. BARNES, OF CHICAGO, ILLINOIS, ASSIGNOR TO MAY WRIGHT BARNES, OF CHICAGO, ILLINOIS.

PERMUTATION MECHANISM.

1,316,934.  Specification of Letters Patent.  Patented Sept. 23, 1919.

Application filed June 13, 1918. Serial No. 239,738.

*To all whom it may concern:*

Be it known that I, ORANGE P. BARNES, a citizen of the United States, and a resident of Chicago, in the county of Cook and State of Illinois, have invented certain new and useful Improvements in Permutation Mechanism, of which the following is a specification, reference being had to the accompanying drawings.

My invention relates to permutation mechanism for controlling electric switches or other devices so that the switch or other device may be operated only by one familiar with the actuating combination, and has for its object to provide a new and improved device of this character which will be especially suitable for application to ignition controlling switches of automobiles or in any other situation where it is desirable to prevent tampering by unauthorized persons with machinery operated by power dependent upon the opening or closing of an electric circuit. The nature of the improvements which characterize my invention will be hereinafter pointed out in connection with the description of the particular embodiment of my invention illustrated in the drawings, and what I regard as new will be pointed out in the claims.

In the accompanying drawings in which I have shown my improved permutation mechanism applied to an automobile switch for which I am about to make separate application for Letters Patent:—

Figure 1 is a perspective view of my improved switch applied to a suitable support, such as the dashboard of an automobile;

Fig. 2 is a central vertical section thereof, as indicated by line 2—2 on Fig. 3;

Fig. 3 is a transverse sectional view on line 3—3 of Fig. 2;

Fig. 4 is an edge view of the switch applied to a suitable support, the case being partly broken away and some of the operating parts being omitted;

Fig. 5 is a section on line 5—5 of Fig. 4 looking down;

Fig. 6 is a perspective view, partly in section, showing the base plate and some of the parts carried thereby;

Fig. 7 in an underside view of the driven wheel by the rotation of which, where, as in the present instance, my invention is embodied in a switch, the making and breaking of the operating circuit is accomplished, showing the permutation ring applied thereto;

Fig. 8 is a perspective view of one of the operating buttons;

Fig. 9 is a perspective view, partly in section, of the driven wheel above referred to;

Fig. 10 is a perspective view of the permutation ring;

Fig. 11 is a perspective view, partly broken away, of the locking ring;

Fig. 12 is an underside view of the locking ring;

Fig. 13 is a perspective view of the driven wheel cap plate; and

Fig. 14 is a fragmentary plan view of the parts shown in Figs. 10, 11 and 13.

Referring to the drawings,—15 indicates a base plate which is circular in form and is provided with a central boss 16 from which rises a spindle 17, as shown in Fig. 2. The boss 16 is preferably hollowed out to provide a recess which receives a mass of insulating material 18, such as sealing wax, for insulating the lead wires hereinafter described. In the surface of the boss 16 around the spindle 17 a circular ball race 19 is provided which receives anti-friction balls 20, as shown in said figure. 21 indicates a series of pins projecting from the inner surface of the base-plate 15 near the periphery thereof for the purpose of positioning a series of spiral springs 22 which serve to normally hold the push buttons hereinafter described in operative position and to return them to such position after they have been operated. 23 indicates the driven wheel which is mounted upon the boss 16 resting on the anti-friction balls 20, being provided on its under surface with a race-way corresponding with the race-way 19. The wheel 23 is rotatably fitted on the spindle 17 and is secured thereon by a collar 24 fitted upon the upper end of said spindle over the hub of the wheel 23 and secured by a tapered pin 25, as shown in Fig. 2. The upper surface of the hub of the wheel 23 and the lower surface of the collar 25 are provided with race-ways which receive anti-friction balls 26, so that the wheel 23 is mounted between upper and lower ball-bearings, and consequently turns readily about the spindle 17 when operated. The extent to which the wheel 23 may rotate in either direction is limited by means of a lug 27 which depends from said wheel near its margin and operates between two stop arms 28, 29 pivoted respectively at 30, 31 on the base-plate 15, as shown in Fig. 5. The stop arm 28 operates between two stops 32, 33 at opposite sides thereof, and in like manner the stop arm 29 operates between two stops 34, 35. Springs 36, 37 connected to said stop arms, respectively, and to an intermediate pin 38 normally hold the stop arms against the stops 32, 34, respectively, but permit them to swing back to an extent limited by the stops 33, 35. It will be apparent that when the driven wheel 23 is rotated to carry the lug 27 into engagement with the stop arm 28, for example, further movement in the same direction of the driven wheel will be yieldingly resisted by the spring 36. If the driven wheel be rotated in the opposite direction the stop arm 29 and the spring 37 associated therewith will operate in the same way to resist further movement of the driven wheel in that direction. The stops 33, 35 are not essential as in the normal operation of the device the arms 28, 29 do not move far enough to engage them. For the purpose of yieldingly holding the driven wheel 23 in different intermediate positions, it is provided with a depending segmental bar 39 having in its outer surface a series of depressions 40. Coöperating with this bar is a plunger 41 mounted in a radially-disposed passage 42 in a boss 43 carried by the base-plate 15. The outer end of the passage 42 is closed by a screw plug 44, between which and the plunger 41 is a spring 45 which presses inwardly on the plunger and causes its rounded head to bear against the outer notched surface of the bar 39. By this arrangement the plunger 41 co-acts with the bar 39 to form a sort of ratchet stop or detent which holds the driven wheel 23 in different positions of adjustment but permits it to be shifted from one position to another under moderate torque strain. The notches or recesses 40 are spaced a measured distance apart so that successive rotary impulses applied to the driven wheel, as hereinafter described, will move it intermittently through uniform arcs.

46, 47 indicate inner and outer segmental contact plates concentrically mounted on the base-plate 15 and insulated therefrom by insulating material 48. The contact plates 46, 47 are connected respectively to wires 49, 50 which extend through an opening 51 in one side of the boss 16, as shown in Fig. 5, and out through the central recess in said boss, as shown in Fig. 2. 52, 53 indicate a second pair of contact plates arranged similarly to the contact plates 47, 48 and separated therefrom by an insulating block 54, as shown in Fig. 5. The contact plates 52, 53 are also insulated from the base-plate 15 by insulating material 48. 55, 56 indicate wires connected with the contact plates 52, 53, respectively, which wires extend through an opening 57$^a$ at one side of the boss 16 and out through the recess 18 in the bottom of said boss, as shown in Figs. 2 and 5. The connections of the wires 49, 50 are such that by bridging the contact plates 46, 47, the operating current which this switch mechanism is designed to control will be grounded or otherwise made inoperative, and the wires 55, 56 are so connected that when bridging connection is made between the contact plates 52, 53 the operating circuit will be closed. The making and breaking of the operating circuit is controlled by the movement of the driven wheel 23 which is provided at its underside with a swinging arm 57 having at its free end a contact device or shoe 58 which is adapted to bear upon the several contact plates above described and to form a bridging connection either between contact plates 52, 53 or the contact plates 46, 47. The arm 57 is hinged at 59 to a plate 60 secured to the under side of the driven wheel 23 and insulated therefrom by an insulating plate 61, as best shown in Fig. 7. The shoe 58 is pressed down in yielding contact with the contact plates carried by the base-plate 15 by means of a spring 62, as best shown in Fig. 4. As therein shown, said spring is interposed between the upper surface of the arm 57 and the under surface of the driven wheel 23. A downwardly projecting pin 63 carried by the plate 60 serves to prevent lateral displacement of the arm 57, as shown in Figs. 4 and 7. From the foregoing description it will be understood that when the driven wheel 23 is in such position that the shoe 58 bears upon contact plates 46, 47 the operating circuit will be broken, and this is true also when said shoe lies on the insulating block 54 between the pairs of contact plates. When, however, the driven wheel 23 is turned to bring the shoe 58 into contact with contact plates 52, 53 the operating circuit will be closed. In the device illustrated the parts are constructed and arranged so that to move the driven wheel 23 from one extreme position to the other it must be given four successive impulses in the same direction. Thus, assuming that the movement is from inoperative to operative position, at the end of each of the first three impulses the circuit will still remain grounded or broken, the shoe 58 bearing upon the insulating block 54 at the end of the third impulse, but the fourth impulse will carry the shoe into contact with contact plates 52, 53, thereby closing the circuit. The several recesses or notches 40 in the segmental bar 39 are so located that the driven wheel 23 is arrested with the shoe 58 in the above-described positions with reference to the several contact plates.

The driven wheel 23 is rotated in one direction or the other for the purpose of operating the switching mechanism above described by means of permutation mechanism which will now be described.

64 indicates a casing or shell which fits over the base-plate 15 and incloses the operating mechanism. Said casing is preferably provided with a peripheral flange 65 by which it may be secured to a suitable support, such as the dashboard of an automobile. 66 indicates a series of push buttons fitted in openings in the face of the shell 64 and extending outwardly therefrom, as illustrated in Figs. 1 and 2. Said push buttons are all alike and are properly lettered or numbered so that they may be distinguished from each other. I prefer to provide eight of such push buttons and to letter them consecutively with the capital letters E I G H T Z O N, but any other lettering or numbering may be used, and the number of push buttons provided may also be varied. The construction of the several push buttons is best shown in Fig. 8. It will be seen that each of said buttons is provided at its inner end with a block 67 at the lower end of which is a pin 68 which is adapted to register with one of the pins 21 carried by the base-plate 15, the pins 68 serving as supports for the upper ends of the springs 22. Said springs, therefore, operate to normally hold the push buttons 66 in their outer or projected position. The block 67 is provided at its opposite outer margins with the ribs 69 which are adapted to slide in vertical grooves 70 provided in the inner circumference of the shell 64 so that the blocks 67 slide longitudinally in said grooves when the buttons 66 are pushed in or are moved out again by the springs 22. Each of the blocks 67 is provided on its inner face with a diagonal rib or cam 71 and with a pin 72 which projects beyond the inner face of the cam 71, as shown in Fig. 8. The pins 72 occupy a radial position with reference to the axis of the driven wheel 23, as shown in Fig. 3, for a purpose which will be hereinafter set forth.

73 indicates a permutation or unlocking ring the construction which is best shown in Fig. 10. Said ring is loosely mounted upon the driven wheel 23 by means of inwardly projecting segmental plates 74 carried by said ring and adapted to rest upon a shoulder 75 formed by cutting away the upper marginal portion of the driven wheel 23, as shown in Fig. 9. Thus the margin of the permutation ring 73 extends out a short distance beyond the periphery of the lower portion of the driven wheel 23, as shown in Fig. 2. For the purpose of limiting the extent to which the permutation ring may move independently of the driven wheel 23 said driven wheel is provided with a segmental abutment 76 which subtends a somewhat shorter arc than the spaces between consecutive plates 74, the parts being so proportioned that the permutation ring 73 may move independently of the driven wheel 23 to the extent of the interval represented by one step. It will be noted that as shown in Fig. 10 the center of the several segmental plates 74 are ninety degrees apart and also that said plates are of about one-half the thickness of the abutment 76, so that when the permutation ring 73 is in place on the wheel 23 the abutment 76 rises somewhat above the upper surfaces of the plates 74. One of the plates 74 carries an upwardly projecting pin 77, which, as will hereinafter appear, serves as a stop and also as a means of attachment for one end of a spiral spring by which said ring is connected with the driven wheel 23. As also shown in Fig. 10, the periphery of the permutation ring 73 is provided with a number of screw-threaded holes 78 which are adapted to receive pins 79 which project radially from the ring 73 as shown in said figure. The location of the pins 79 determines the permutation series by which the switch is operated, and consequently by varying the position of said pins the combination by which the switch is operated may be changed. The number of pins also may be varied if desired, although in a given lock neither the location of the pins 79 nor the number need be changed as the combination can be otherwise more conveniently altered. The pins 79 are adapted to be moved into position to underlie the paths of the several cams 71 on the push buttons, but as will more clearly hereinafter appear, only one of said pins at a time is in position to be operated by one of said cams. It is obvious, therefore, that by pushing in the push button which overlies the proper pin 79 its cam 71 will engage such pin, and, owing to the inclination of the cam, the permutation ring 73 will be moved around in a counterclockwise direction the space of one interval or step. The permutation series is so arranged that this will again bring one of the pins 79 into operative position under the cam 71 of the next button of the series, so that by pushing such push button the permutation ring may be shifted another step in the same direction, and consequently when in the arrangement illustrated the proper four push buttons have been operated in succession the permutation ring 73 will have been moved four steps in a constant direction; of course, where the permutation series requires the operation of the same button more than once the result is the same. Each movement given to the permutation ring is communicated to the driven wheel 23 through the engagement of one of the segmental plates 74 with the abutment 76, and consequently the driven wheel will turn with the permutation ring, thereby moving the shoe 58 in the manner hereinbefore described.

The pushing of any push button not of the proper series does not directly affect the position of the permutation or unlocking ring 73 because no pin 79 will be in position to be actuated by such push button, but provision is made for setting back the permutation ring and the driven wheel 23 if any push button is operated improperly so as to break up the permutation series to a greater or less extent and thereby defeat any attempt to operate the switch by anyone unacquainted with the proper combination. For this purpose I provide what may conveniently be termed a locking ring 80, best shown in Fig. 11. Said locking ring is adapted to fit upon the driven wheel 23 over the permutation ring 73, as shown in Figs. 4 and 6, and is provided at its lower margin with internally projecting segmental stops 81 set ninety degrees apart and adapted to register with and rest upon the segmental plates 74 carried by the permutation ring 73. The stops 81 at opposite sides of the abutment 76 are also adapted to engage said abutment in the same way as the segmental plates 74, a limited amount of movement of the locking ring 80 independently of the driven wheel 23 being permitted as in the case of the permutation ring 73. The segmental stop 81 which rests upon the plate 74 which carries the pin 77 is also adapted to engage said pin which serves as a stop to limit the rotary movement of the locking plate 80 away from the abutment 76. In other words the abutment 76 limits the rotation of the locking plate 80 in one direction and the pin 77 limits its movement in the opposite direction. One of the segmental stops 81 is provided with a vertical pin 82, shown in Fig. 11, for a purpose which will hereinafter be explained.

The locking ring 80 is provided on its outer surface, except at points over the pins 79 of the permutation ring, with a plurality of equally spaced inclined ribs or cams 83, said cams being spaced apart sufficiently to permit the pins 72 carried by the push buttons 66 to move freely between adjoining cams, and the inclination of said cams is such that when any push button not of the permutation series is pushed in to the limit of its movement its pin 72 will by its engagement with one of the cams 83 rotate the locking plate 80 in a clockwise direction as viewed in Fig. 3 a distance equal to one step. By reason of the engagement of one of the segmental stops 81 with the abutment 76 of the driven wheel 23 this will rotate said driven wheel to an equal extent in the same direction, and the engagement of one of the segmental plates 74 of the permutation ring 73 with the opposite side of the abutment 76 will similarly rotate said permutation ring. When so rotated the driven wheel 23, and with it the permutation ring 73, will be held against reverse movement by the engagement of the detent 41 with one of the notches of the ratchet bar 39. On the return movement of the push button operated under the action of the spring 22 its pin 72 will engage the under surface of the adjacent cam 83 and move the locking ring 80 in the opposite direction far enough to permit the pin 72 to pass it and return to its normal position above the upper margin of the locking ring. This reverse movement of the locking ring is independent of the driven wheel 23 and permutation ring 73 and is provided for by locating the pin 77 so that normally it is far enough from the abutment 76 to permit the required amount of lost motion on the part of the segmental stop 81 which lies between said parts, as illustrated in Fig. 6. As soon as the pin 72 passes up beyond the upper end of the cam 83 the locking ring 80 is again rotated in a clockwise direction to carry the segmental stop 81 into engagement with the abutment 76, as illustrated in Fig. 6, by means of a spring 84 shown in Fig. 6, one end of which is connected with the pin 82 and the other end of which is connected with a pin 85 carried by a cap-plate 86 fitted over the upper portion of the driven wheel 23 and fixedly secured thereto, as by screws 86ª shown in Fig. 3. The tendency of the spring 84 is to move the locking ring 80 in a clockwise direction as viewed in Fig. 6, and consequently it operates in the manner above described. A similar spring 87 secured to a pin 88 carried by the cap-plate 86 and to the pin 77 carried by the permutation ring 73 tends to rotate the permutation ring in the opposite direction and consequently hold one of the segmental plates 74 normally against the opposite side of the abutment 76, as shown in Fig. 6. The purpose of this construction is to permit the permutation ring to be moved in a reverse direction independently of the driven member to a sufficient extent to permit the push button cam 71 to pass it on the return or outward movement of the push button, when, as sometimes occurs, two of the pins 79 are set in adjacent holes 78 of the permutation ring, and by the actuation of the appropriate push button its cam 71 has moved down between such adjoining pins. In such case one of the pins would be engaged by the operating face of said cam, thereby moving the permutation ring forward and carrying the adjoining pin 79 in back of the cam 71. When the push button so operated is released it is necessary that the permutation ring may yield in a reverse direction sufficiently to permit the cam to pass outward, after which the permutation ring must be restored to the position into which it was moved by the operative face of said cam. By using the spring 87 these movements are provided for. To permit the necessary movement of the pins 77 and 82 independently of the cap-plate 86 said cap-plate is provided at proper points with segmental recesses 89—90, as shown in Figs. 6 and 13.

At certain points on the periphery of the locking ring 80 are camless spaces 91, 92, 93, 94, best shown in Figs. 11 and 12, which correspond in location with the different pins 79 carried by the permutation ring 73, so that when any push button overlying one of such spaces is operated its pin 72 will not actuate the locking ring 80, and said locking ring will be free to rotate in a counterclockwise direction when the permutation ring is actuated by the engagement of the cam 71 of said push button with the pin 79 of the permutation ring then in operative position. It will be understood, of course, that the disposition of the several cams 83 shown in the drawings is merely illustrative and may be varied to conform to any altered arrangement of the position of the several pins 79 of the permutation ring.

The casing 64 incloses all the operating parts above described, except the outer portions of the push buttons, so that they cannot be tampered with, as illustrated in Fig. 2, and it is secured to the base-plate 15 by screws which pass through holes 95 in the base-plate into bosses 96 provided at intervals around the marginal portion of the casing 64, as shown in Fig. 3. By removing the casing and the cap-plate 86 the combination can be changed by setting the permutation ring 73 and the locking ring 80 in a different relation to the abutment 76 of the driven wheel 23, thus making a different series of push buttons effective to actuate the switch. For ordinary purposes this method of changing the combination is sufficient and it is useful in that it provides a way in which the owner of an automobile, for example, may without difficulty himself change the combination. More radical combination changes may, however, be made by changing the relative location of the several pins 79 of the permutation ring with corresponding changes in the location of the cams 83 of the locking ring.

The operation of my improved permutation mechanism in the embodiment thereof hereinbefore described may be conveniently summarized as follows:—Assuming that the permutation series is made up of the letters O H I O in the order named, if the buttons bearing those letters are pushed in the proper order their respective cams 71 will by their successive engagement with the different pins 79 on the permutation ring, rotate said ring in a counterclockwise direction, whereby the driven member will be rotated to carry the contact device 58 into engagement with the contact plates 52, 53, thereby closing the operating circuit. If the driven member is in its initial position when the first button is pushed it will be moved four successive steps in a counterclockwise direction by the actuation of the four push buttons in the manner described, and if as a result of a previous operation the driven member should have been left advanced one or more steps from its initial position it will nevertheless be operated to close the circuit if the four buttons of the permutation series be actuated in order. For example, if the pin 79 which is designed to be actuated by the cam 71 of the H push button has been left one step in advance of its operative position, when the O push button is first operated its pin 72 will engage one of the cams 83 on the locking ring 80 and will move said locking ring, the permutation ring and the driven member backward one space, thus bringing said pin 79 into position to be actuated by the cam of the H push button to advance the permutation mechanism to its next position, and the same is true as to the other positions which the permutation ring may occupy. If any push button is operated out of order its pin 72 will on its inward stroke engage one of the cams 83 of the locking ring 80 and will move said locking ring, and with it the permutation ring and the driven member, in a reverse or clockwise direction to the extent of one space or step, unless the driven member is then in its initial position, in which case they will be moved temporarily slightly beyond their initial position but will be returned to such position by the action of the spring 36 shown in Fig. 5 as soon as the pressure on the push button is removed. When the parts move back beyond their initial position as described, the detent 41 rides up on the outer surface of the segmental bar 39, but it drops back again into the first notch 40 as soon as the parts return to their initial position. By this construction any one seeking to discover the combination by experiment is unable to tell by the sense of touch whether the permutation mechanism moves in a forward or in a reverse direction as the operation feels the same whether the driven member is moved in one direction or the other. The detent 41 by its engagement with the ratchet bar 39 yieldingly holds the driven member in the different positions to which it may be moved by the operation of the several push buttons. When the driven member is in its initial position the contact device 58 will be in engagement with the contact plates 46, 47, as shown in Fig. 5, and the operating circuit will be grounded or otherwise made inoperative, and the operating circuit will remain broken until said contact device is moved by the operation of the last push button of the series into contact with contact plates 52, 53, whereupon the operating circuit will be closed.

If the permutation series is not properly followed and a push button is operated out of order its pin 72 will engage one of the cams 83 of the locking ring 80 and as above described will thereby reverse the rotation of said locking ring and also of the permutation ring 73 and the driven wheel 23. This reverse movement will be continued if the same button is again pushed, because on successive operations of such push button it will engage successive cams 83 owing to the fact that while its pin 72 on its outward or upward movement rotates the locking ring independently in a counterclockwise direction, as soon as such pin passes beyond the under surface of the cam which it engages the spring 84 will swing the locking ring 80 in a clockwise direction back to the position in which it was moved by the inward movement of the push button, where it will be stopped by the abutment 76. If the several push buttons in the permutation series have been properly operated and the switch closed it will be evident that by operating any push button other than the O button the switch may be set back one space, or by operating two buttons it may be set back two spaces, the switch being opened in either case. The owner may, therefore, open the switch so as to leave it in condition to be closed by operating only one or two buttons in the proper order. The advantage of this is that he may, for example, let his chauffeur know the last one or two letters of the permutation series without letting him know the complete combination, thereby allowing him when desired to lock the car against unauthorized use by the chauffeur whereas at other times he can lock it so that the chauffeur can unlock it by using the last one or two letters of the series. Of course, if the switch is completely locked by pushing a locking button four times no one not in possession of the complete combination could operate the switch.

It will be noted that by my improved construction a permutation series may be used which involves the use of a given button either one or a number of times and this adds very much to the difficulty of detecting the true permutation series by experiment, as it is far more baffling than would be the use of a numerical series none of which could be used more than once. For example, Z Z Z Z, or Z G G Z and thousands of other similar permutation series are so difficult to discover as to make the opening of the lock by unauthorized persons practically impossible. The use of a switch comprising a contact device or shoe which slides over contact plates under considerable pressure, as described, is advantageous in that it keeps the contact terminals polished and free from dust and foreign substances and secures the wiping contact recommended by electrical experts. When the switch is fully locked the current is grounded and the contact device is four removes from the terminals through which the operating circuit is established, and said circuit can be closed only by pushing the four buttons of the permutation series in their fixed order. Any deviation from this order or the operation of any other button again grounds the current and prevents the operation of the car. The detent device used to hold the driven wheel against accidental movement operates uniformly whether the movement of the driven wheel is toward or from the locking position, thus making it impossible to detect by pushing any button whether the driven wheel is moved for making or breaking the circuit, and consequently increasing the difficulty of closing the switch by experimental manipulation.

My improved permutation mechanism is very compact and is of convenient design so that when used to control the ignition switch of an automobile it may be bolted directly to the dashboard, or may be set flush with the dash in a circular opening as is the case with speedometers, clocks and other attachments, and consequently can be conveniently operated by the owner on entering or leaving his car. The switch illustrated and described is designed primarily for automobiles but it may also be applied to motor boats and in any other situation where it is desired to provide a switch lock to control the opening or closing of an electric circuit. It should be understood, however, that I do not herein claim the novel features of the switch *per se*, as I am about to file a separate application for patent therefor, as hereinbefore mentioned.

While I have specifically described the embodiment of my invention illustrated in the drawings, I wish it to be understood that my invention is not limited to the particular construction shown and described, but is generic so far as the subject-matter of the broader claims is concerned, and includes the use of the improved permutation mechanism shown and described for any purpose for which it is suitable.

What I claim as my invention and desire to secure by Letters Patent, is—

1. A permutation mechanism comprising a rotary driven member movable toward and from its operative position, a plurality of push buttons, a permutation ring associated with said driven member and actuated by the proper operation of the push buttons of the permutation series to move said driven member to its operative position, and a rotary member actuated in the opposite direction by incorrect operation of said push buttons for positively moving said driven member away from its operative position.

2. A permutation mechanism comprising a rotary driven member movable toward and from its operative position, a plurality of push buttons, a permutation ring associated with said driven member and actuated by the proper operation of the push buttons of the permutation series to move said driven member step by step to its operative position, and means actuated by incorrect operation of any of said push buttons for positively moving said driven member step by step away from its operative position.

3. A permutation mechanism comprising a rotary driven member movable toward and from its operative position, a plurality of push buttons, a permutation ring associated with said driven member and actuated by the proper operation of the push buttons of the permutation series to move said driven member to its operative position, and a locking ring associated with said driven member and actuated by incorrect operation of said push buttons to positively move said driven member away from its operative position.

4. A permutation mechanism comprising a rotary driven member movable toward and from its operative position, a plurality of push buttons, a permutation ring associated with said driven member and actuated by the proper operation of the push buttons of the permutation series to move said driven member step by step to its operative position, and a locking ring associated with said driven member and actuated by incorrect operation of said push buttons to move said driven member step by step away from its operative position.

5. A permutation mechanism comprising a rotary driven member movable toward and from its operative position, a plurality of push buttons, a permutation ring carried by said driven member and actuated by the proper operation of the push buttons of the permutation series to move said driven member to its operative position, and a locking ring carried by said driven member and actuated by incorrect operation of said push buttons to move said driven member away from its operative position.

6. A permutation mechanism comprising a rotary driven member movable toward and from its operative position, a plurality of push buttons, a permutation ring carried by said driven member and actuated by the proper operation of the push buttons of the permutation series to move said driven member step by step to its operative position, and a locking ring carried by said driven member and actuated by incorrect operation of said push buttons to move said driven member step by step away from its operative position.

7. A permutation mechanism comprising a rotary driven member movable toward and from its operative position, a plurality of push buttons, means actuated by the proper operation of the push buttons of the permutation series for rotating said driven member in one direction to its operative position, and a locking ring carried by said driven member and arranged to be rotated in the opposite direction by incorrect operation of said push buttons and operating to move said driven member away from its operative position.

8. A permutation mechanism comprising a rotary driven member movable toward and from its operative position, a plurality of push buttons, means actuated by the proper operation of the push buttons of the permutation series for moving said driven member to its operative position, and a locking ring carried by said driven member and having a series of cams arranged to be operated by incorrect operation of said push buttons to move said driven member away from its operative position.

9. A permutation mechanism comprising a driven member movable toward and from its operative position, a plurality of push buttons, means associated with said driven member and actuated by the proper operation of the push buttons of the permutation series to move said driven member step by step to its operative position, a detent operating to yieldingly hold said driven member in its different positions, and means actuated by incorrect operation of said push buttons to move said driven member step by step away from its operative position.

10. A permutation mechanism comprising a rotary driven member movable toward and from its operative position, a plurality of push buttons, a permutation ring yieldingly connected with said driven member and actuated by the proper operation of the push buttons of the permutation series to move said driven member step by step in one direction to its operative position, and a rotary member actuated by incorrect operation of said push buttons to move said driven member in the opposite direction.

11. A permutation mechanism comprising a rotary driven member movable toward and from its operative position, a plurality of push buttons, a permutation ring associated with said driven member and having a limited movement independently thereof, said permutation ring being arranged to be actuated by the proper operation of the push buttons of the permutation series to move said driven member step by step in one direction to its operative position, and a spring connecting said permutation ring with said driven member for yieldingly holding said permutation ring in its normal relation to said driven member.

12. A permutation mechanism comprising a rotary driven member movable toward and from its operative position, a plurality of push buttons, a permutation ring associated with said driven member and actuated by the proper operation of the push buttons of the permutation series to move said driven member step by step in one direction to its operative position, and means yieldingly connected with said driven member and actuated by incorrect operation of said push buttons to move said driven member step by step in the opposite direction.

13. A permutation mechanism comprising a rotary driven member movable toward and from its operative position, a plurality of push buttons, a permutation ring yieldingly connected with said driven member and actuated by the proper operation of the push buttons of the permutation series to move said driven member step by step in one direction to its operative position, means actuated by incorrect operation of said push buttons to move said driven member in the opposite direction, and a detent for yieldingly holding said driven member in position after the actuation of any of said push buttons.

14. A permutation mechanism comprising a rotary driven member movable toward and from its operative position, a plurality of push buttons, means actuated by the proper operation of the push buttons of the permutation series to move said driven member in one direction to its operative position, and a locking ring yieldingly connected with said driven member and actuated by incorrect operation of said push buttons to move said driven member step by step in the opposite direction.

15. A permutation mechanism comprising a rotary driven member movable toward and from its operative position, a plurality of push buttons, means associated with said driven member and actuated by the proper operation of the push buttons of the permutation series to move said driven member to its operative position, a locking ring associated with said driven member and actuated by incorrect operation of said push buttons to move said driven member step by step in the opposite direction, said locking ring having a limited movement independently of said driven member, and a spring connecting said locking ring with said driven member for yieldingly holding said locking ring in its normal relation to said driven member.

16. A permutation mechanism comprising a rotary driven member movable toward and from its operative position, a plurality of push buttons, a permutation ring yieldingly connected with said driven member and actuated by the proper operation of the push buttons of the permutation series to move said driven member step by step in one direction to its operative position, and a locking ring yieldingly connected with said driven member and actuated by incorrect operation of said push buttons to move said driven member step by step in the opposite direction.

17. A permutation mechanism comprising a rotary driven member movable toward and from its operative position, a plurality of push buttons, permutation and locking rings associated with said driven member and each having a limited movement independently thereof, said permutation ring being arranged to be actuated by the proper operation of the push buttons of the permutation series to move said driven member step by step in one direction to its operative position, and said locking ring being arranged to be actuated by incorrect operation of said push buttons to move said driven member step by step in the opposite direction, and springs connecting said permutation and locking rings with said driven member for yieldingly holding them respectively in normal relation to said driven member.

18. A permutation mechanism comprising a rotary driven member movable toward and from its operative position, a plurality of push buttons, a permutation ring associated with said driven member and actuated by the proper operation of the push buttons of the permutation series to move said driven member step by step in one direction to its operative position, means yieldingly connected with said driven member and actuated by incorrect operation of said push buttons to move said driven member step by step in the opposite direction, and a stop for limiting the extent to which said driven member may move away from its operative position.

19. A permutation mechanism comprising a rotary driven member movable toward and from its operative position, a permutation ring carried by said driven member and having a series of actuating members, a plurality of push buttons adapted when the push buttons of the permutation series are properly operated to engage said actuating members and rotate said driven member in one direction by a step by step movement, and a locking ring carried by said driven member and having a series of members adapted to be engaged and operated by incorrect operation of said push buttons to move said driven member in the opposite direction by a step by step movement.

20. A permutation mechanism comprising a rotary driven member movable toward and from its operative position, a permutation ring carried by said driven member and having a series of actuating members, a plurality of push buttons adapted when the push buttons of the permutation series are properly operated to engage said actuating members and rotate said driven member in one direction by a step by step movement, a locking ring yieldingly connected with said driven member and actuated by incorrect operation of said push buttons to move said driven member in the opposite direction, and means for limiting the extent to which said driven member may rotate in the latter direction.

21. A permutation mechanism comprising a rotary driven member movable toward and from its operative position, a permutation ring mounted on said driven member and connected therewith, said permutation ring having a series of projecting pins, a locking ring mounted on said driven member and yieldingly connected therewith, said locking ring having a series of cams, and a plurality of push buttons disposed around said locking and permutation rings, said push buttons having cams adapted to engage said pins to move said driven member and said locking ring in one direction and having a series of pins adapted to engage the cams on said locking ring to move said driven member and the permutation ring in the opposite direction.

22. A permutation mechanism comprising a rotary driven member movable toward and from its operative position, a permutation ring mounted on said driven member and yieldingly connected therewith, said permutation ring having a series of projecting pins, a locking ring mounted on said driven member and yieldingly connected therewith, said locking ring having a series of cams, and a plurality of push buttons disposed around said locking and permutation rings, said push buttons having cams adapted to engage said pins to move said driven member and said locking ring in one direction and having a series of pins adapted to engage the cams on said locking ring to move said driven member and the permutation ring in the opposite direction.

23. A permutation mechanism comprising a rotary driven member movable toward and from its operative position, a permutation ring mounted on said driven member and having a limited movement independently thereof, said permutation ring having a series of projecting pins, a locking ring mounted on said driven member and having a limited movement independently thereof, said locking ring having a series of cams, springs connecting said permutation and locking rings with said driven member for yieldingly holding them respectively in normal relation thereto, and a plurality of push buttons disposed around said locking and permutation rings, said push buttons having cams adapted to engage said pins to move said driven member and said locking ring step by step in one direction and having a series of pins adapted to engage the cams on said locking ring to move the driven member and the permutation ring step by step in the opposite direction.

24. A permutation mechanism comprising a rotary driven member movable toward and from its operative position, a permutation ring mounted on said driven member and connected therewith, said permutation ring having a series of projecting pins, a locking ring mounted on said driven member and yieldingly connected therewith, said locking ring having a series of cams, a plurality of push buttons disposed around said locking and permutation rings, said push buttons having cams adapted to engage said pins to move said driven member and said locking ring in one direction and having a series of pins adapted to engage the cams on said locking ring to move said driven member and the permutation ring in the opposite direction, and means for limiting the movement of said driven member away from its operative position.

25. A permutation mechanism comprising a rotary driven member movable toward and from its operative position, a permutation ring mounted on said driven member and yieldingly connected therewith, said permutation ring having a series of projecting pins, a locking ring mounted on said driven member and yieldingly connected therewith, said locking ring having a series of cams, a plurality of push buttons disposed around said locking and permutation rings, said push buttons having cams adapted to engage said pins to move said driven member and said locking ring in one direction and having a series of pins adapted to engage the cams on said locking ring to move said driven member and the permutation ring in the opposite direction, and means for limiting the movement of said driven member in either direction.

26. A permutation mechanism comprising a rotary driven member movable toward and from its operative position, a permutation ring mounted on said driven member and yieldingly connected therewith, said permutation ring having a series of projecting pins, a locking ring mounted on said driven member and yieldingly connected therewith, said locking ring having a series of cams, a plurality of push buttons disposed around said locking and permutation rings, said push buttons having cams adapted to engage said pins to move said driven member and said locking ring in one direction and having a series of pins adapted to engage the cams on said locking ring to move said driven member and the permutation ring in the opposite direction, and a detent for yieldingly holding said driven member in position after the actuation of any of said push buttons.

ORANGE P. BARNES.

Copies of this patent may be obtained for five cents each, by addressing the "Commissioner of Patents, Washington, D. C."